United States Patent [19]
Park et al.

[11] Patent Number: 4,541,041
[45] Date of Patent: Sep. 10, 1985

[54] FULL LOAD TO NO-LOAD CONTROL FOR A VOLTAGE FED RESONANT INVERTER

[75] Inventors: John N. Park, Rexford; Robert L. Steigerwald, Scotia, both of N.Y.

[73] Assignee: General Electric Company, Schenectady, N.Y.

[21] Appl. No.: 525,065

[22] Filed: Aug. 22, 1983

[51] Int. Cl.³ .............................................. H02M 1/14
[52] U.S. Cl. ...................................... 363/41; 363/17; 363/98; 363/132
[58] Field of Search ....................... 363/17, 28, 41, 75, 363/79, 96, 97, 98, 132, 136; 378/112

[56] References Cited

U.S. PATENT DOCUMENTS

| | | |
|---|---|---|
| 4,446,560 | 5/1984 | Gabor .................................... 363/79 |
| 4,477,868 | 10/1984 | Steigerwald ........................... 363/17 |

Primary Examiner—Peter S. Wong
Assistant Examiner—Anita M. Ault
Attorney, Agent, or Firm—Mark L. Mollon; James C. Davis, Jr.; Marvin Snyder

[57] ABSTRACT

A control for a voltage fed series resonant inverter includes controllable switch means which supplies square wave voltage signals to a resonant series circuit. The output of the inverter is coupled to a rectifier to provide dc power to a load. The control comprises summer means for comparing a commanded dc voltage to an actual dc output voltage and providing an error signal. An oscillator responsive to the error signal generates a frequency signal that is coupled to the controllable switch means to vary the frequency of the square wave voltage supplied to the resonant circuit. The duty cycle of the frequency signal is adjusted so that the frequency signal is provided in bursts during low load conditions thereby minimizing circulating currents while maintaining the output voltage with closed loop frequency control.

6 Claims, 4 Drawing Figures

FULL LOAD TO NO-LOAD CONTROL FOR A VOLTAGE FED RESONANT INVERTER

This invention relates to voltage fed resonant inverters and more particularly to a control for operating voltage fed series resonant inverters with a parallel connected load across one of the series resonant circuit components.

Operating dc-ac inverters with a resonant load is attractive since sine wave output currents and voltages can be achieved, and since inverter switching devices can operate with low switching losses. Another advantage of resonant inverters is the potential for reduced electromagnetic interference due to the low harmonic content of the sinusoidal output current and voltages.

In voltage-fed series resonant inverters with the load connected in parallel with one of the series resonant components, low load operation using known resonant type inverter controls results in large circulating currents in the reactive components of the resonant circuit. When resonant inverters are used in medical X-ray applications to supply the high voltage required across the X-ray tube, a dc voltage is converted to a high frequency ac voltage which is then stepped up and rectified to provide high voltage dc to the X-ray tube. In X-ray applications, peak power outputs are required for short lengths of time when penetrating X-rays are desired and low power outputs are required for longer lengths of time when scanning X-rays are desired. Since the peak power outputs are required for short lengths of time, it would be desirable not to have to design the transformer for steady-state power handling capability so that a physically smaller, lower weight, less expensive transformer could be used. However, with series inverters having the load connected in parallel with one of the reactive resonant components, large circulating reactive currents exist in the circuit during no load and low-load conditions, requiring devices such as the inverter output transformer to be designed with steady state full load current handling capability.

It is an object of the present invention to provide a control for a voltage fed resonant inverter which reduces circulating current in the resonant elements so as to avoid excessive power dissipation during no-load and light load operation.

SUMMARY OF THE INVENTION

In one aspect of the present invention, a control for a voltage fed series resonant inverter is provided having controllable switch means which supplies square wave voltage signals to a series resonant circuit. The output of the inverter is coupled to a rectifier to provide dc power to a load. The control comprises summer means for comparing a commanded dc voltage to an actual dc output voltage and providing an error signal. An oscillator means responsive to the error signal generates a frequency signal that is coupled to the controllable switch means to vary the frequency of the square wave voltage supplied to the resonant circuit by closed loop control. The duty cycle of the frequency signal supplied to the controllable switch means is adjusted so that the frequency signal is provided in bursts during low load conditions thereby minimizing circulating currents while maintaining the output voltage due to the closed loop frequency control.

BRIEF DESCRIPTION OF THE DRAWING

While the specification concludes with claims particularly pointing out and distinctly claiming the present invention, the objects and advantages of the invention can be more readily ascertained from the following description of preferred embodiments when used in conjunction with the accompanying drawing in which:

DETAILED DESCRIPTION OF THE DRAWINGS

Figure 1:
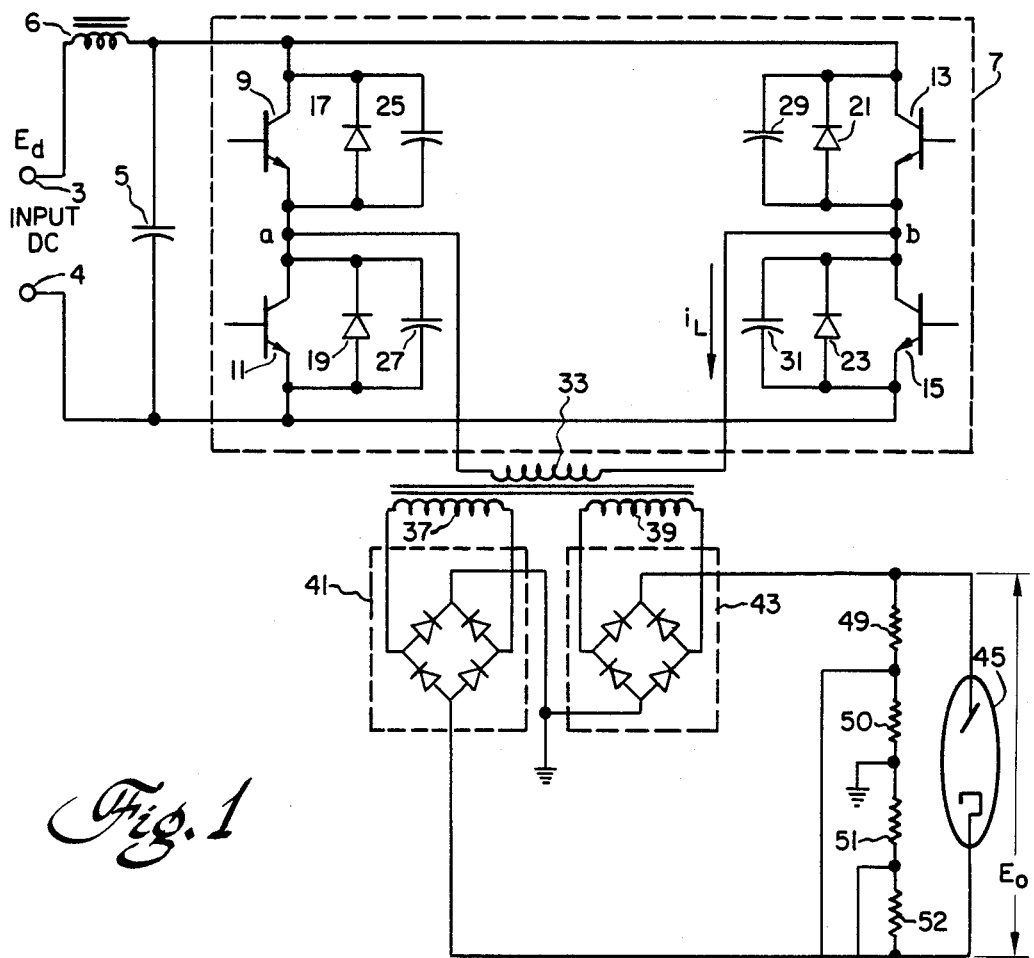
FIG. 1 is a part block diagram, part schematic representation of a voltage fed resonant converter and control in accordance with the present invention.
Figure 1:
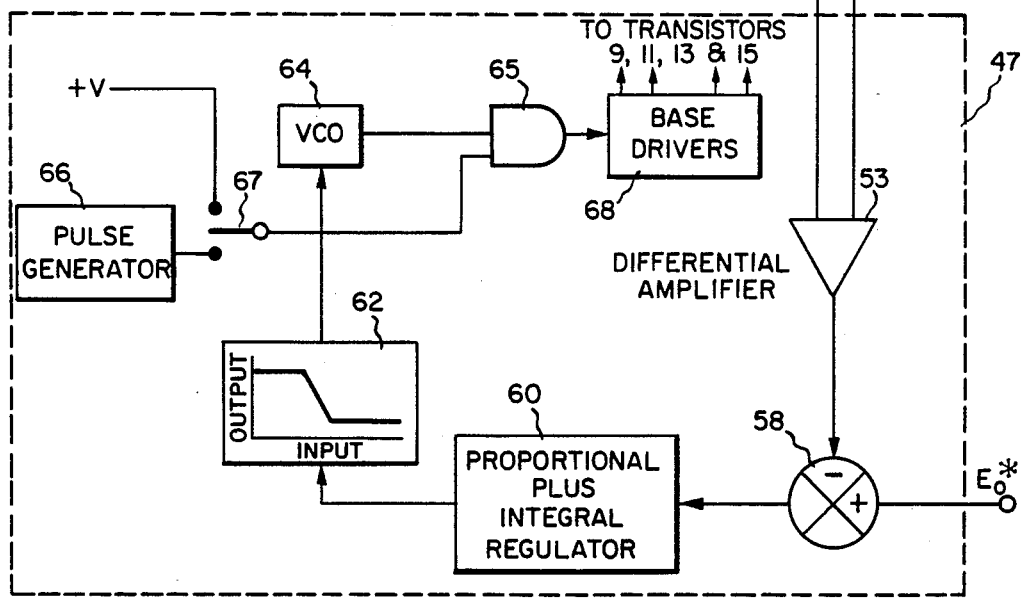

Referring now to the drawings wherein like numerals designate like elements, there is shown in FIG. 1 a resonant dc to dc converter. An external source of dc power (not shown) provides dc power at terminals 3 and 4. Interconnected between terminals 3 and one end of a high frequency capacitance filter 5 is a 120 Hertz inductive filter 6. The other end of capacitance filter 5 is connected to terminal 4. A full bridge inverter 7 is provided having four switching devices that are capable of carrying reverse current and capable of being turned off by a switching signal. The switching devices are shown as bipolar junction power transistors 9, 11, 13 and 15, each switching device having an inverse diode 17, 19, 21 and 23 connected in parallel, respectively. Other switching devices with gate turn-off capability which could be used instead of the parallel connected transistor diode combinations are power metal-oxide semiconductor field effect transistors (MOSFETs) (reverse current carried by an integral parasitic diode), monolithic Darlingtons (reverse current carried by a parasitic diode) and gate turn-off silicon controlled rectifiers each having a diode connected in inverse parallel. Power transistors 9 and 11 are connected in series with one another across capacitor 5 as are power transistors 13 and 15. The output of inverter 7 is available across the junctions and between series connected transistors 9 and 11, and series connected transistors 13 and 15, respectively. Snubbers comprising snubber capacitors 25, 27, 29 and 32 are each connected across respective transistors 9, 11, 13 and 15.

A primary winding 33 of a high frequency-high voltage step-up transformer 35 operating typically at 5–30 kilohertz, is connected between junctions a and b in inverter 7. The transformer 35 has two secondary windings 37 and 39. A high voltage full bridge diode rectifier 41 is connected across secondary winding 37 and the high voltage full bridge rectifier 43 is connected across secondary winding 39. The outputs of the two bridge rectifiers 41 and 43 are connected in series with one another, with the junction of the two rectifiers grounded to reduce insulation to ground requirements of the transformer and to facilitate voltage and current measurements for control purposes. The two rectifiers supply a load shown in FIG. 1 as an X-ray tube 45.

A control 47 has as input signals a commanded output dc voltage $E_o^*$ for the dc-dc converter and a feedback voltage signal proportional to $E_o$. The feedback voltage signal is obtained from a voltage divider comprising resistors 49, 50, 51 and 52 connected in series with one another, with the series combination connected across the X-ray tube 45. The junction between resistors 50 and 51 is grounded and the voltage divider output voltage is taken across resistors 51 and 50. The output voltage of the voltage divider is supplied to a differential amplifier 53 (the output voltage of the voltage divider between resistors 49 and 50 is positive relative to ground, and the output voltage between resistors 51 and 52 is negative relative to ground) producing a signal proportional to the output voltage. The commanded voltage is compared to the signal proportional to the actual output voltage $E_o$ in summer 58 to generate an error signal. The error signal is passed through a proportional plus integral regulator 60, to a limit circuit 62. The regulator 60 shown does not invert the signal. The limit circuit 62 assures that a lagging load is presented to the inverter by allowing the inverter to operate at or above the resonant frequency of the series resonant circuit.

The resonating circuit of FIG. 1 is realized with parasitic elements with the transformer leakage reactances serving as the resonating inductor while the transformer shunt capacitance serves as the resonating capacitance. The parasitic resonant components act as though they are in series with one another with the load connected across the resonating capacitance. For a more detailed explanation, reference should be made to copending patent application Ser. No. 438,828, entitled "High Frequency X-ray Generator Power Supply", filed Nov. 3, 1982 and assigned to the instant assignee. The above referenced application is hereby incorporated by reference. The output of the limit circuit is connected to a voltage controlled oscillator 64. The voltage control oscillator is connected to one input of a two input AND gate 65. The other input of AND gate 65 is connected to either a logical one voltage level +V or a pulse generator 66 by a switch 67. The output of the AND gate is connected to base driver 68 which is coupled to the bases of transistors 9, 11, 13 and 15, and alternately switches the transistors at opposite corners of the inverter.

Figure 2:
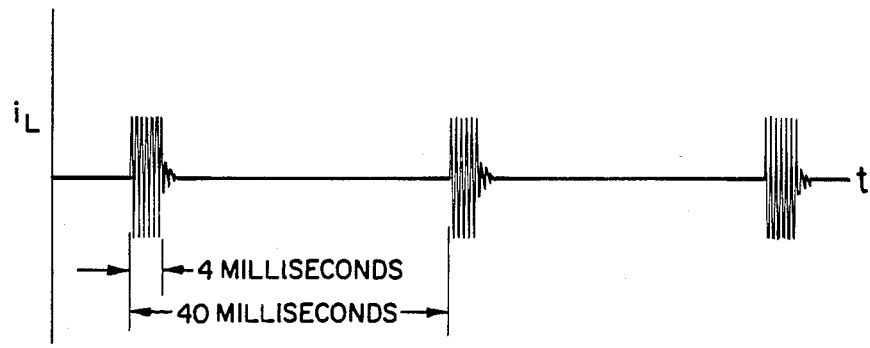
FIG. 2 is a waveform diagram showing the expected current in the primary of the step-up transformer during low load operation.

Operation of the circuit of FIG. 1 will now be described. A commanded dc output voltage $E_o^*$ is compared in summer 58 to a signal proportional to the actual output voltage $E_o$ to develop an error signal. The error signal, after passing through the proportional plus integral regulator circuits 60, which provides gain and aids in stablization of the feedback loop is supplied to an input of the limit amplifier circuit 62. The limit amplifier circuit provides a maximum output signal in response to a minimum error signal and a minimum output signal in response to a maximum signal. The curve in box 62 represents the transfer function of the amplifier with the X-axis representing the input signal and the y-axis the resulting signal. The output signal of the limit circuit when provided to the voltage controlled oscillator 64 results in a signal of selected frequency, or frequency signal supplied to the base driver 68 which in turn switches the transistors 9, 11, 13 and 15 of the inverter 7, when switch 67 is a first position enabling AND gate 65. Switch 67 is positioned in the first position when high power X-rays are required. The switch can be set when the X-ray operator selects the tube voltage and filament heating current. When switch 67 is in a second position corresponding to low power pulse X-rays, pulse generator 66 enables AND gate 65 when pulses from the generator are at a logical one level and disables AND gate 65 when the pulses are at a logical zero level. The pulses from generator 66 result in bursts of switching signals applied to transistors 9, 11, 13 and 15. The square waves produced by transistors 9, 11, 13 and 15 across the resonant circuit are illustrated in FIG. 2 during the burst mode. For the shown application a duty cycle of 10% has been found to operate satisfactorily to maintain the regulated value of X-ray tube plate voltage without appreciable output ripple during the burst period. The frequency of the square wave supplied by the inverter bridge to drive the series resonant circuit parasitic elements of the transformer above its resonant frequency is under closed loop control at all times, including operation in the burst mode. As the error signal from summer 58 increases in a positive direction, signifying a call for additional voltage step-up, the limit circuit 62 decreases the voltage supplied to the voltage control oscillator, thereby decreasing the frequency of the signal supplied to the parasitic resonant circuit causing the circuit to operate closer to its damped resonant frequency.

Figure 3:
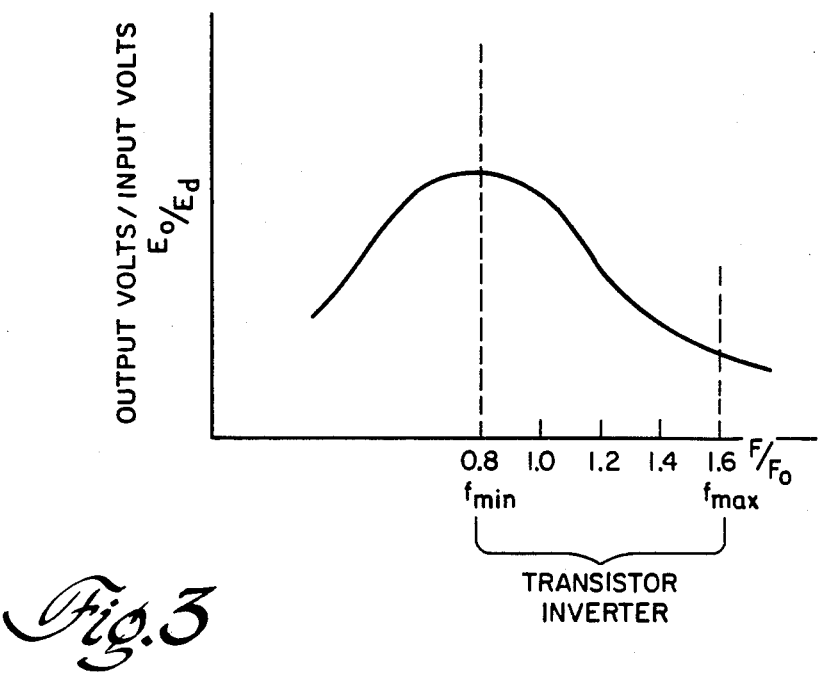
FIG. 3 is a graph showing the ratio of the output voltage to the input voltage of the inverter of FIG. 1 due to the resonant voltage transformation.

Referring to FIG. 3, the ratio of the output voltage to the input voltage versus normalized inverter frequency is shown for a load impedance expressed by the equation $$R_o40 = R/\sqrt{L/C} \tag{1}$$

where
  R is load resistance connected to the resonant circuit and
  L and C are the effective inductance and capacitance of the parasitic circuit, respectively.

Maximum step-up occurs with minimum damping at the damped resonant frequency which is slightly lower than the resonant frequency of the parasitic circuit. The resonant frequency $F_O$ is defined by $$F_0 = 1/(2\pi\sqrt{LC}) \tag{2}$$

A resonant frequency ratio of 1 signifies that the actual frequency F which is in the numerator is equal to the resonant frequency $F_0$ in the denominator. The voltage developed across the individual energy storage elements and the series resonant circuit is dependent on the damping provided by the rectifier, filter and tube and the frequency of operation.

In a resonant circuit, the voltage across one series energy storage element can be greater than the voltage across the series combination of the resonant circuit elements. High instantaneous voltages across the inductance and capacitance occur 180° out of phase with one another. The output voltage of the resonant circuit in the apparatus of FIG. 1 is taken across the equivalent shunt capacitance of the resonant circuit of the transformer parasitic resonant circuit. At low load situations, occurring when a relatively small filament heater current is flowing, large circulating currents flow in the resonant circuit of approximately the same value as when full power is supplied to the tube. By operating the inverter with a burst of oscillations, the parasitic capacitance charge can be maintained at substantially the regulated value without undue output ripple with the capacitance being recharged during burst intervals.

Large continuous circulating currents in the transformer can be avoided, reducing the sizing requirements of the transformer together with the power dissipated.

Figure 4:
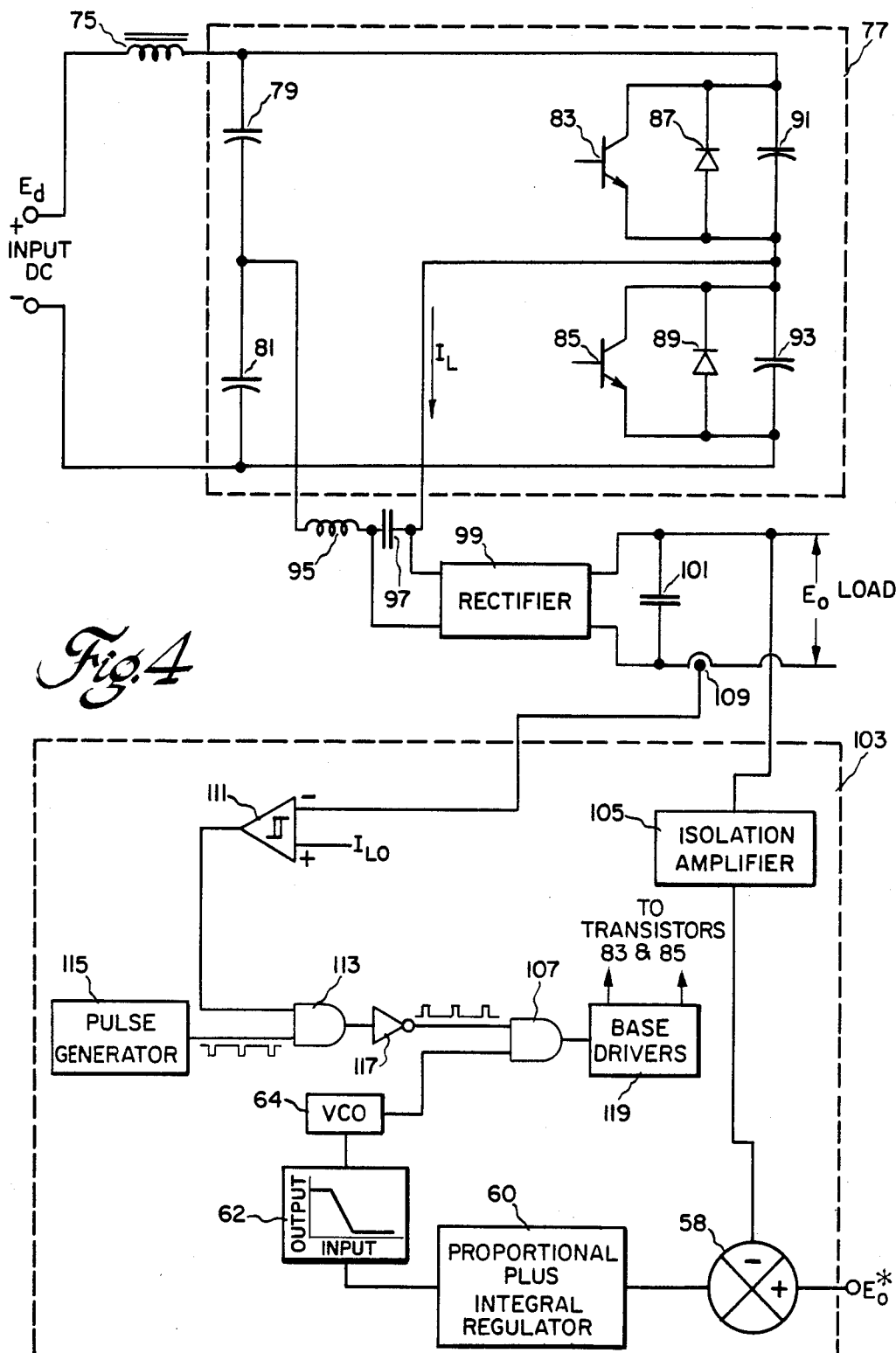
FIG. 4 is a part block diagram, part schematic representation of another embodiment of a resonant converter and control in accordance with the present invention.

Referring now to FIG. 4, a half bridge arrangement of the present invention is shown. DC input power obtained from an external source (not shown) is connected through an inductor 75 to a half bridge inverter 77 comprising two capacitors 79 and 81 connected in series across the positive and negative rails of the dc input power to establish a split power supply. Two series connected switches capable of conducting reverse current are connected between the positive and negative rails of the half bridge inverter 77. The switches shown are bipolar transistors 83 and 85 with inverse parallel diodes 87 and 89 connected across each switch, respectively. Lossless snubbers comprising capacitors 91 and 93 are each connected across the switches, respectively.

The output of the half bridge inverter is available across the junctions between the series connected capacitors 79 and 81 and the two series connected switches. A resonant circuit comprises an inductor 95 and a capacitor 97 connected in series across the output of the half bridge inverter. The output of the resonant circuit is available across the capacitor and is connected to the input of a rectifier 99. The output of the rectifier is connected in parallel with a filter capacitor 101 and to a load not shown.

A control 103 has an input of load voltage supplied to an isolation amplifier 105. The output of the isolation amplifier and a commanded output voltage $E_o^*$ are compared in a summer 58 and the resulting error signal is passed through a proportional plus integral regulator circuit 60 to the input of a limit circuit 62. The regulator 60 shown does not invert the signal. The limit circuit 62 assures that a lagging load is presented to the inverter by allowing the inverter to operate at or above the resonant frequency of the series resonant circuit. The output of the limit circuit 62 is connected to a voltage controlled oscillator 64. The output of the voltage controlled oscillator is connected to one input of a two input AND gate 107.

A current sensor 109 measures the current supplied to the load of the resonant converter. The load current is compared to a predetermined value of load current $I_{LO}$ in a differential comparator with hysteresis 111. The output of comparator 111 is connected to one input of a two input AND gate 113. Connected to the other input is the output of a pulse generator 115. The output of AND gate 113 is connected to a logic inverter 117. The output of the logic inverter is connected to the other input of AND gate 107. The output of AND gate 107 provides input signals to a base driver circuit 119 which is coupled to the bases of transistors 83 and 85 and alternately switches the two transistors 83 and 85.

In operation, FIG. 4 works in a similar fashion to FIG. 1 except that a half bridge inverter is used to provide square wave voltage across a series resonant circuit and the burst mode of operation is determined by the current magnitude supplied by the resonant circuit to the load (not shown).

When the current provided by the converter to a load drops below a predetermined amount, shown as $I_{LO}$, the output of the differential amplifier with hysteresis transitions to a high or logical one state enabling AND gate 113. A pulse with a predetermined duty cycle is inverted in inverter 117 and enables AND gate 107 for short periods of time to allow bursts of frequency signals from the voltage controlled oscillator to supply square waves of voltage to the resonant circuit. The frequency of the applied pulses is determined by the closed loop which comprises elements 105, 58, 60, 62, 64 and 119, which collectively are responsive to the difference between commanded and actual load voltage. When the load current is greater than a predetermined value $I_{LO}$, AND gate 113 is disabled and AND gate 107 is enabled, permitting the output of the voltage controlled oscillator 64 to continuously provide frequency signals to switch transistors 83 and 85.

The size of filter capacitor 101 is selected so that during burst mode operation at a particular duty cycle, when the burst signal is present the voltage across the capacitor can be built up to the commanded value without excessive output ripple.

While the pulse generator 115 shown has a fixed duty cycle, it is also possible to vary the duty cycle as a function of load current with longer bursts occurring at higher load currents.

The foregoing describes a control for a voltage-fed series resonant inverter that achieves good regulation of the output voltage of the inverter from no load to full load and which reduces circulating continuous currents in the resonant elements which can result in excessive power dissipation during no load and light load operation.

While the invention has been particularly shown and described with reference to several embodiments thereof, it will be understood by those skilled in the art that various changes in form and details may be made without departing from the spirit and scope of the invention.

What is claimed is:

1. A control for a voltage fed series resonant inverter, having controllable switch means which provides a square wave voltage to a resonant series circuit, the output of said inverter coupled to a rectifier to provide dc power to a load, said control comprising:
   summer means for comparing a commanded dc voltage to the actual dc output voltage of said inverter and providing an error signal;
   oscillator means responsive to said error signal for generating a frequency signal, said oscillator means coupled to said controllable switch means to thereby vary the square wave voltage frequency supplied to said resonant circuit; and
   means for controlling the duty cycle of said frequency signal supplied to said controllable switch means so that said frequency signals are supplied in bursts during low load conditions thereby minimizing continuous circulating currents while maintaining the output voltage with low ripple.

2. The control of claim 1 wherein said means for controlling the duty cycle of said frequency signal comprises:
   means for sensing the current supplied to the load;
   comparison means for determining when said sensed current exceeds a predetermined value, and
   means responsive to said comparison means for reducing the duty cycle of the frequency signal supplied to said controllable switch means when said predetermined value exceeds said sensed current.

3. The control of claim 1 wherein said means for controlling the duty cycle of said frequency signal comprises:

an AND gate coupling said oscillator means to said controllable switch means;
a pulse generator for providing pulses having a predetermined duty cycle;
voltage means for providing a logical one voltage level; and
a switch for selectively connecting either said pulse generator or said voltage means to said AND gate.

4. A voltage fed series resonant inverter and control for providing dc power to a load comprising:
a voltage fed series resonant inverter having controllable switch means which provide a square voltage to a resonant series circuit;
a rectifier coupled to the output of said inverter to provide dc power to the load;
summer means for comparing a commanded dc voltage to the actual dc output voltage of said inverter and providing an error signal;
oscillator means responsive to said error signal for generating a frequency signal, said oscillator means coupled to said controllable switch means to thereby vary the square wave voltage frequency supplied to said resonant circuit; and
means for controlling the duty cycle of said frequency signal supplied to said controllable switch means so that said frequency signals are supplied in bursts during low load conditions thereby minimizing continuous circulating currents while maintaining the output voltage with low ripple.

5. The inverter and control of claim 4 wherein said means for controlling the duty cycle of said frequency signal comprises:
means for sensing the current supplied to the load;
comparison means for determining when said sensed current exceeds a predetermined value;
means responsive to said comparison means for reducing the duty cycle of the frequency signal supplied to said controllable switch means when said predetermined value exceeds said sensed current.

6. The inverter and control of claim 4 wherein said means for controlling the duty cycle of said frequency signal comprises:
an AND gate coupling said oscillator means to said controllable switch means;
a pulse generator for providing pulses having a predetermined duty cycle;
voltage means for providing a logical one voltage level; and
a switch for selectively connecting either said pulse generator or said voltage means to said AND gate.

* * * * *